US011857983B2

(12) United States Patent
Yan

(10) Patent No.: US 11,857,983 B2
(45) Date of Patent: Jan. 2, 2024

(54) MAGNETIC SHOWER HEAD THAT CAN BE PREVENTED FROM FALLING OFF

(71) Applicant: Xiamen Galenpoo Kitchen & Bathroom Technology Co, Ltd., Fujian (CN)

(72) Inventor: Xiaoling Yan, Fujian (CN)

( * ) Notice: Subject to any disclaimer, the term of this patent is extended or adjusted under 35 U.S.C. 154(b) by 0 days.

(21) Appl. No.: 18/221,397

(22) Filed: Jul. 13, 2023

(65) Prior Publication Data

US 2023/0356239 A1 Nov. 9, 2023

(51) Int. Cl.
*B05B 1/18* (2006.01)

(52) U.S. Cl.
CPC .................................... *B05B 1/185* (2013.01)

(58) Field of Classification Search
CPC ........................................................ B05B 1/18
See application file for complete search history.

(56) References Cited

U.S. PATENT DOCUMENTS

2021/0060598 A1* 3/2021 Lee ............................ E03C 1/06

FOREIGN PATENT DOCUMENTS

CN 112974001 * 6/2021

* cited by examiner

*Primary Examiner* — Qingzhang Zhou
*Assistant Examiner* — Joel Zhou

(57) ABSTRACT

A magnetic shower head that can be prevented from falling off due to any accidental reasons, which includes a shower head and a fixing seat, and two magnetic assemblies to achieve magnetic attachment between the shower head and the fixing seat. One magnetic assembly is mounted on the shower head, and another magnetic assembly is mounted on the fixing seat. The first magnetic assembly includes a first mounting seat, a first magnetic piece and a fastener. The second magnetic assembly includes a second mounting seat and a second magnetic piece. The fastener is movable to achieve locking and unlocking of the shower head with respect to the fixing seat.

9 Claims, 9 Drawing Sheets

MAGNETIC SHOWER HEAD THAT CAN BE PREVENTED FROM FALLING OFF

A magnetic shower head that can be prevented from falling off

BACKGROUND OF THE INVENTION

The present invention relates to the technical field of shower heads, and more particularly relates to a magnetic shower head that can be prevented from falling off.

Shower head is the most commonly used water outlet device in daily life. Various shower heads are now available in the market to meet different consumer demands. Normally speaking, user requires the shower head to be fixed on the wall when the shower head is not used or when the user does not want to hold the shower head. Therefore, different shower head fixing devices are also available in the market. For example, there is a kind of commonly seen shower head socket fixed on the wall with a C-shaped opening on which the shower head can be hung. More conveniently, there is also a kind of magnetic fixing seat installed on the wall so that the shower head can be magnetically attached to the magnetic fixing seat.

However, positioning of the shower head has to be very precise when using the magnetic fixing seat. The shower head has to be attached point-to-point or surface-to-surface to an attaching surface of the magnetic fixing seat so as to ensure that the magnetic force is sufficient to hold the shower head and to prevent the shower head from falling off. During such a use environment, when the user accidentally hits on the shower head or the water hose connecting with the shower head, the shower head may be easily disengaged from the attaching surface of the magnetic fixing seat causing a reduced magnetic force which is insufficient to hold the shower head, and hence the shower head may fall off and being damaged.

BRIEF SUMMARY OF THE INVENTION

In view of the aforesaid disadvantages in the prior art, it is an object of the present invention to provide a magnetic shower head that can be prevented from falling off. By such a preventive function, the shower head is prevented from accidentally falling off and being damaged due to different accidental reasons.

To achieve the above object, the present invention provides the following technical solutions:

A magnetic shower head that can be prevented from falling off, comprising a shower head and a fixing seat which the shower head is magnetically attached to, and also comprising a first magnetic assembly and a second magnetic assembly to achieve magnetic attachment between the shower head and the fixing seat; one of the first magnetic assembly and the second magnetic assembly is mounted on a back side of the shower head, and another one of the first magnetic assembly and the second magnetic assembly is mounted on the fixing seat; the first magnetic assembly comprises a first mounting seat, a first magnetic piece, and a fastener; the first mounting seat is provided with an annular groove; the first magnetic piece is mounted in a space enclosed by an inner side wall of the annular groove; the fastener is installed in the first mounting seat and is movable along a radial direction of the annular groove so as to be movable in and out of the annular groove; the fastener is also provided with a fastener groove which is in communication with the annular groove; one side of an opening of the fastener groove is provided with a position limiting flange; the second magnetic assembly comprises a second mounting seat and a second magnetic piece; an insertion cylinder is projected from the second mounting seat; a periphery of a free end of the insertion cylinder is provided with a position limiting ring; the second magnetic piece is mounted inside the insertion cylinder.

The insertion cylinder is removably inserted into the annular groove, so that when the second magnetic piece and the first magnetic piece are magnetically attached to each other, and the fastener is driven to move into the annular groove along a radial direction of the annular groove so that the position limiting ring is prevented from moving along an axial direction of the annular groove by the position limiting flange of the fastener.

Preferably, one side of the fastener groove is a first inclined surface; the first inclined surface is positioned on a side of the fastener groove which is proximal to a center of the annular groove along a radial direction of the annular groove; when the first magnetic piece and the second magnetic piece are magnetically attached to each other, a portion of the insertion cylinder is also inserted into the fastener groove and abuts against the first inclined surface.

Preferably, an outer side of the position limiting flange facing away from the fastener groove and an inner side of the position limiting flange facing towards the fastener groove are provided with a second inclined surface and a third inclined surface respectively.

The annular groove is positioned on a front side of the first mounting seat; a back side of the first mounting seat is provided with a fastener mounting groove extending into the annular groove along a radial direction of the annular groove so that the fastener mounting groove is in communication with the annular groove through an outer side wall of the annular groove; the fastener is movably fitted in the fastener mounting groove.

Preferably, two sides of the fastener mounting groove are each provided with a guiding platform; two sides of the fastener are each provided with a guiding flange slidably fitted with a corresponding guiding platform.

The first mounting seat is provided with a first mounting hole in which the first magnetic piece is mounted; the second mounting seat is provided with a second mounting hole in which the second magnetic piece is mounted.

Preferably, a first shell is fitted and axially limited in the first mounting hole, and a second shell is fitted and axially limited in the second mounting hole; the first shell and the second shell house the first magnetic piece and the second magnetic piece respectively.

The second magnetic assembly also comprises a friction ring disposed circumferentially around the insertion cylinder.

The first magnetic piece is made of stainless steel; the second magnetic piece is a neodymium magnet.

By using the above technical solutions, the present invention has the following technical effects:

1) The fastener is provided in the first magnetic assembly, wherein the fastener is movable along a radial direction; specifically, after the insertion cylinder is inserted into the annular groove, an end of a portion of the insertion cylinder abutting against the fastener will drive the fastener to move into the annular groove along a radial direction of the annular groove, so that the position limiting flange of the fastener limits the position limiting ring of the insertion cylinder from moving along an axial direction of the annular groove/insertion cylinder, thereby preventing the shower head from falling off.

2) The annular groove and the insertion cylinder are both in a circular shape so that the shower head can be fixed with the fixing seat no matter how the shower head is rotated on a plane parallel to the fixing seat before it is fixed with the fixing seat. Use of the present invention is facilitated since the shower head can be fixed with the fixing seat at more than one position at any angle rotated with respect to the fixing seat on the plane parallel to the fixing seat.

3) The first magnetic piece and the second magnetic piece achieve the basic magnetic connection, and provide a magnetic driving force which is translated to a radial force of the fastener during insertion of the insertion cylinder into the annular groove. The greater the magnetic force, the more stable will be the position limiting effect between the position limiting flange and the position limiting ring.

REFERENCE NUMBERS IN THE FIGURES

Figure 1:
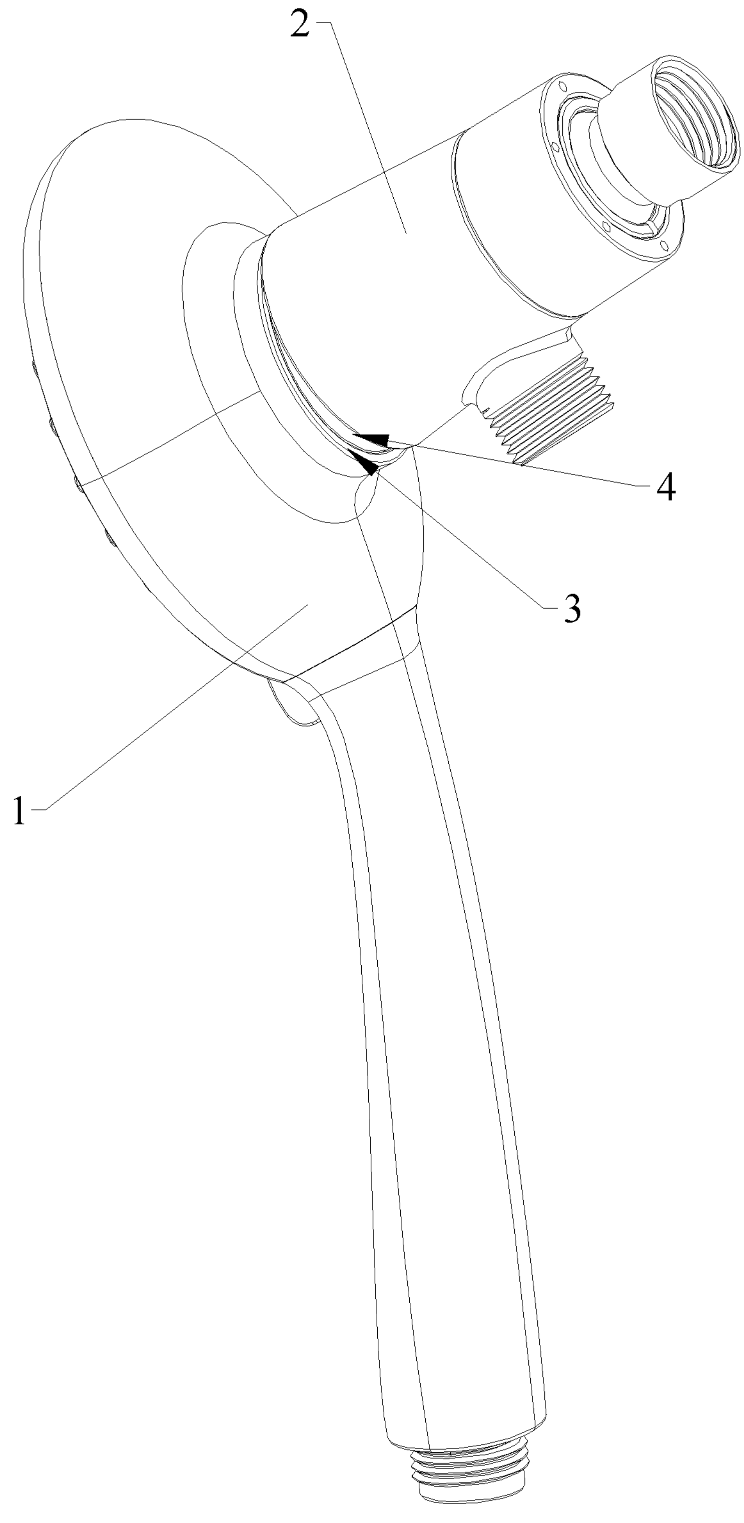
FIG. 1 is a perspective view according to an embodiment of the present invention.
Figure 2:
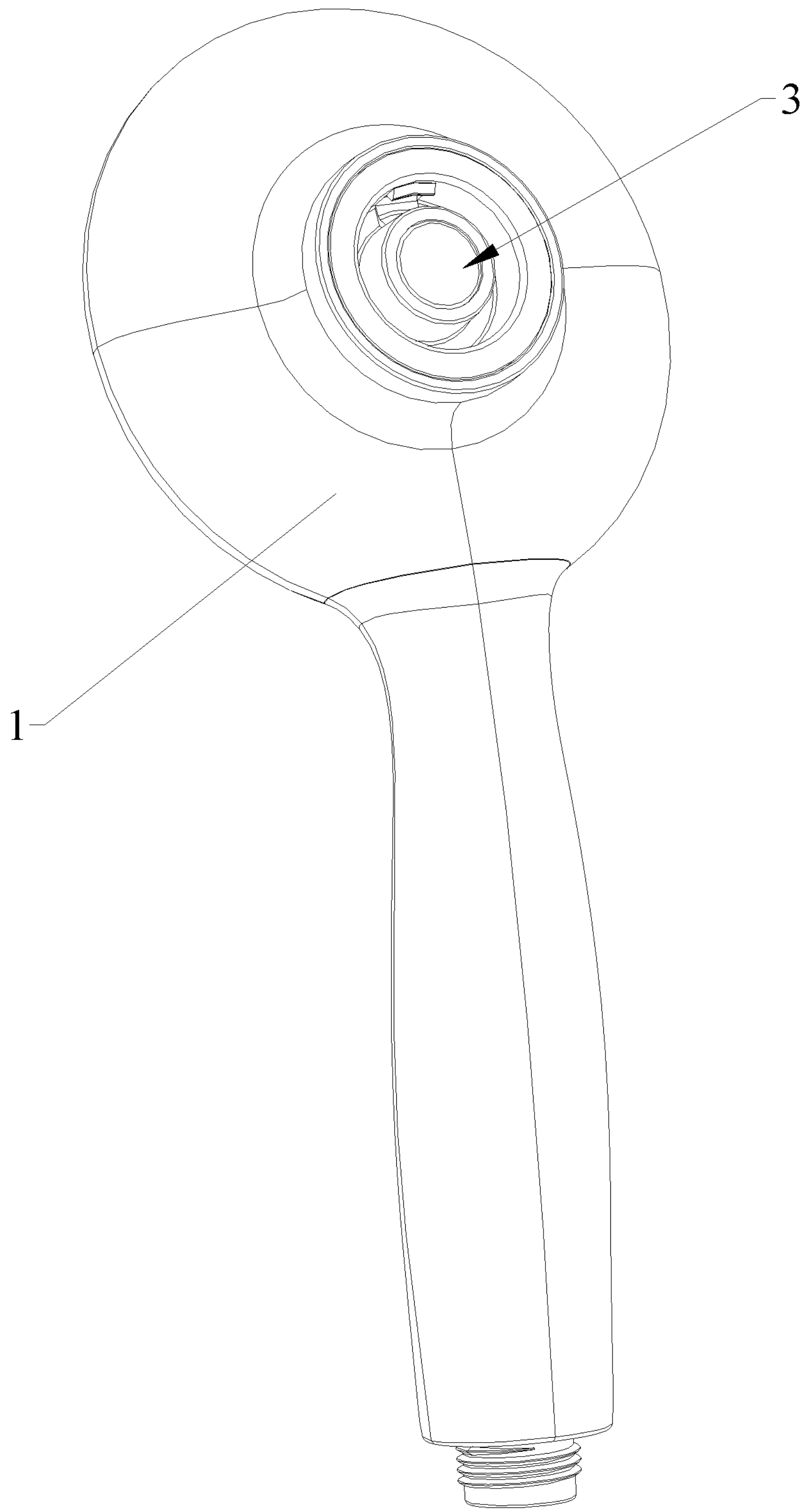
FIG. 2 is a perspective view showing the shower head and the first magnetic assembly according to an embodiment of the present invention.
Figure 3:
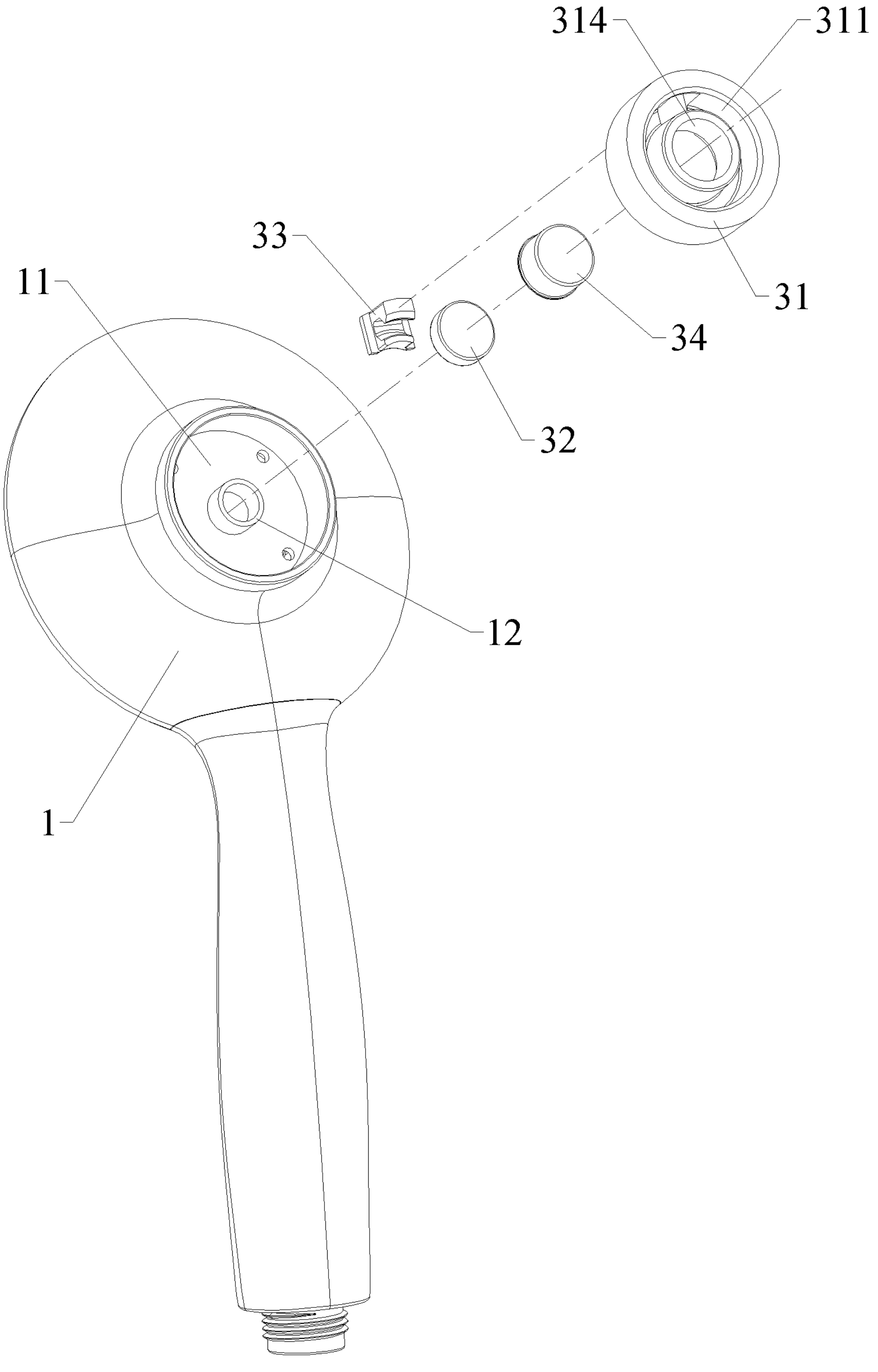
FIG. 3 is an exploded view of FIG. 2.

1—shower head; 11—first mounting groove; 12—first column;

2—fixing seat; 21—second mounting groove; 22—second column;

3—first magnetic assembly; 31—first mounting seat; 311—annular groove; 312—fastener mounting groove; 313—guiding platform; 314—first mounting hole; 32—first magnetic piece; 33—fastener; 331—fastener groove; 332—position limiting flange; 333—first inclined surface; 334—second inclined surface; 335—third inclined surface; 336—guiding flange; 34—first shell;

4—second magnetic assembly; 41—second mounting seat; 411—insertion cylinder; 412—position limiting ring; 413—second mounting hole; 42—second magnetic piece; 43—second shell; 44—friction ring.

DETAILED DESCRIPTION OF THE INVENTION

With reference to FIGS. 1-9, the present invention provides a shower head that can be prevented from falling off, comprising a shower head 1 and a fixing seat 2 which the shower head 1 is magnetically attached to, and also comprising a first magnetic assembly 3 and a second magnetic assembly 4 to achieve magnetic attachment between the shower head 1 and the fixing seat 2. One of the first magnetic assembly 3 and the second magnetic assembly 4 is mounted on a back side of the shower head 1, and another one of the first magnetic assembly 3 and the second magnetic assembly 4 is mounted on the fixing seat 2.

The first magnetic assembly 3 comprises a first mounting seat 31, a first magnetic piece 32, and a fastener 33; the first mounting seat 31 is recessed from an end surface thereof to form an annular groove 311; the first magnetic piece 32 is mounted in a space enclosed by an inner side wall of the annular groove 311; the fastener 33 is installed in the first mounting seat 31 and is movable along a radial direction of the annular groove 311 so as to be movable in and out of the annular groove 311; the fastener 33 is also provided with a fastener groove 331 which is in communication with the annular groove 311; one side of an opening of the fastener groove 331 is provided with a position limiting flange 332.

The second magnetic assembly 4 comprises a second mounting seat 41 and a second magnetic piece 42; an insertion cylinder 411 is projected from the second mounting seat 41; a periphery of a free end of the insertion cylinder 411 is provided with a position limiting ring 412; the second magnetic piece 42 is mounted inside the insertion cylinder 411.

During use, the insertion cylinder 411 is inserted into the annular groove 311, so that the second magnetic piece 42 and the first magnetic piece 32 are magnetically attached to each other, and the fastener 33 is driven to move into the annular groove 311 along a radial direction of the annular groove 311 so that the position limiting ring 412 is prevented from moving along an axial direction of the annular groove 311 by the position limiting flange 332 of the fastener 33.

A specific embodiment of the present invention is illustrated below.

The first magnetic assembly 3 and the second magnetic assembly 4 arranged on the shower head 1 and the fixing seat 2 achieve both the functions of male-female connection and magnetic connection without affecting the original functions of the shower head 1 and the fixing seat 2. Therefore, the first magnetic assembly 3 and the second magnetic assembly 4 can be freely disposed anywhere on the shower head 1 and the fixing seat 2. In this embodiment, the first magnetic assembly 3 is mounted on a back side of the shower head 1, and the second magnetic assembly 4 is mounted on a front side of the fixing seat 2. In other words, in some other embodiments, the first magnetic assembly 3 may be mounted on the front side of the fixing seat 2, and the second magnetic assembly 4 may be mounted on the back side of the shower head 1.

Further, the first mounting seat 31 and the second mounting seat 41 are connected to the shower head 1 and the fixing seat 2 by screw connection so that the first mounting seat 31 and the second mounting seat 41 can be removably connected for easier assembly and disassembly.

The first magnetic assembly 3 or the second magnetic assembly 4 is mounted on the back side of the shower head 1, and specifically on a back side of a shell of the shower head 1, and more specifically on a back side of the shower head 1 which is opposite to a front disc of the shower head 1 where water comes out. According to this mounting position, there will be sufficiently large space provided for the designs of the first magnetic assembly 3 or the second magnetic assembly 4. Of course, according to some other embodiments, the first magnetic assembly 3 or the second magnetic assembly 4 may be mounted on a handle of the shower head 1.

Further, the shower head 1 and the fixing seat 2 are provided with a first mounting groove 11 and a second mounting groove 21 respectively so as to mount the first magnetic assembly 3 and the second magnetic assembly 4.

Figure 5:
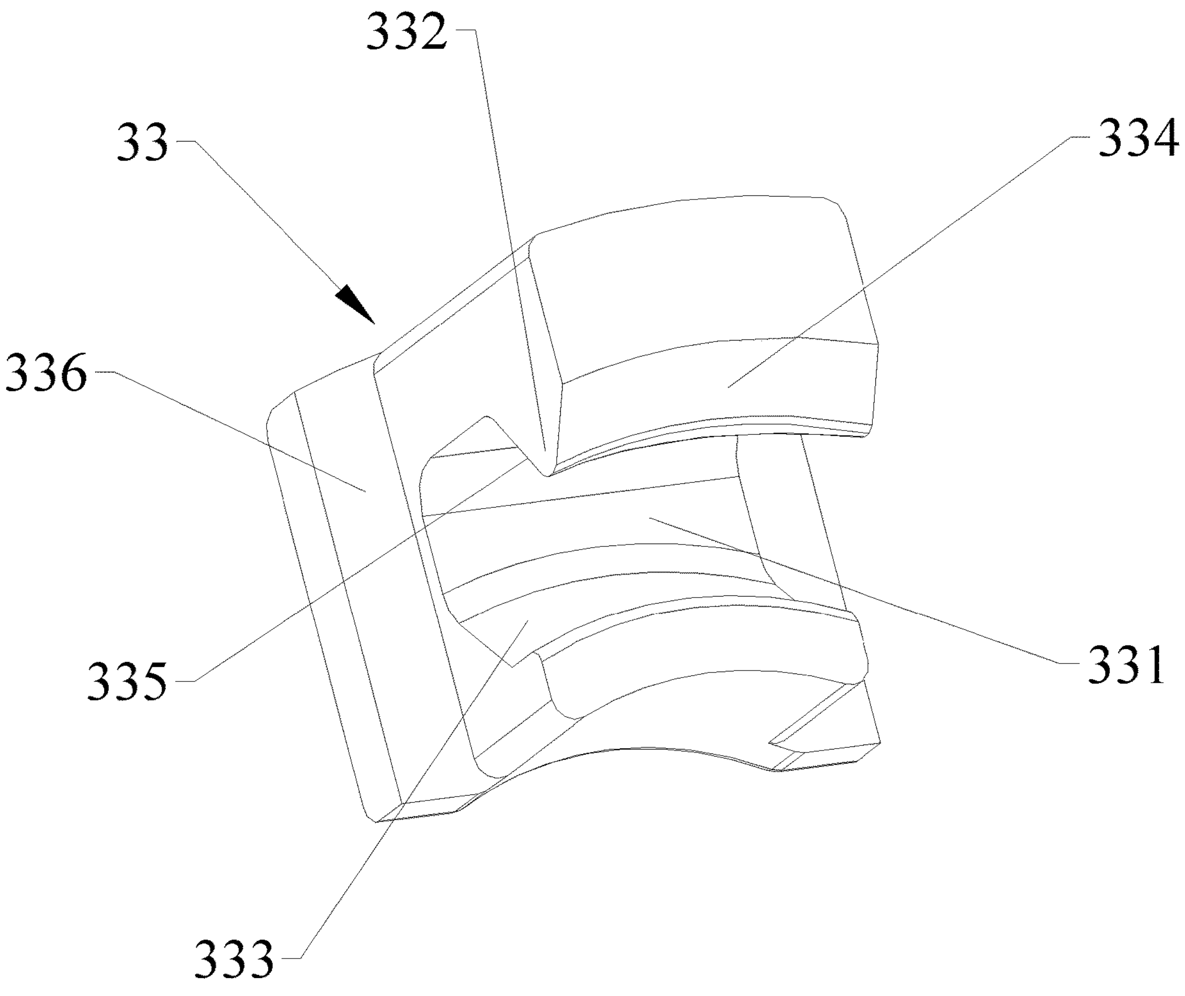
FIG. 5 is a perspective view of the fastener according to an embodiment of the present invention.
Figure 6:
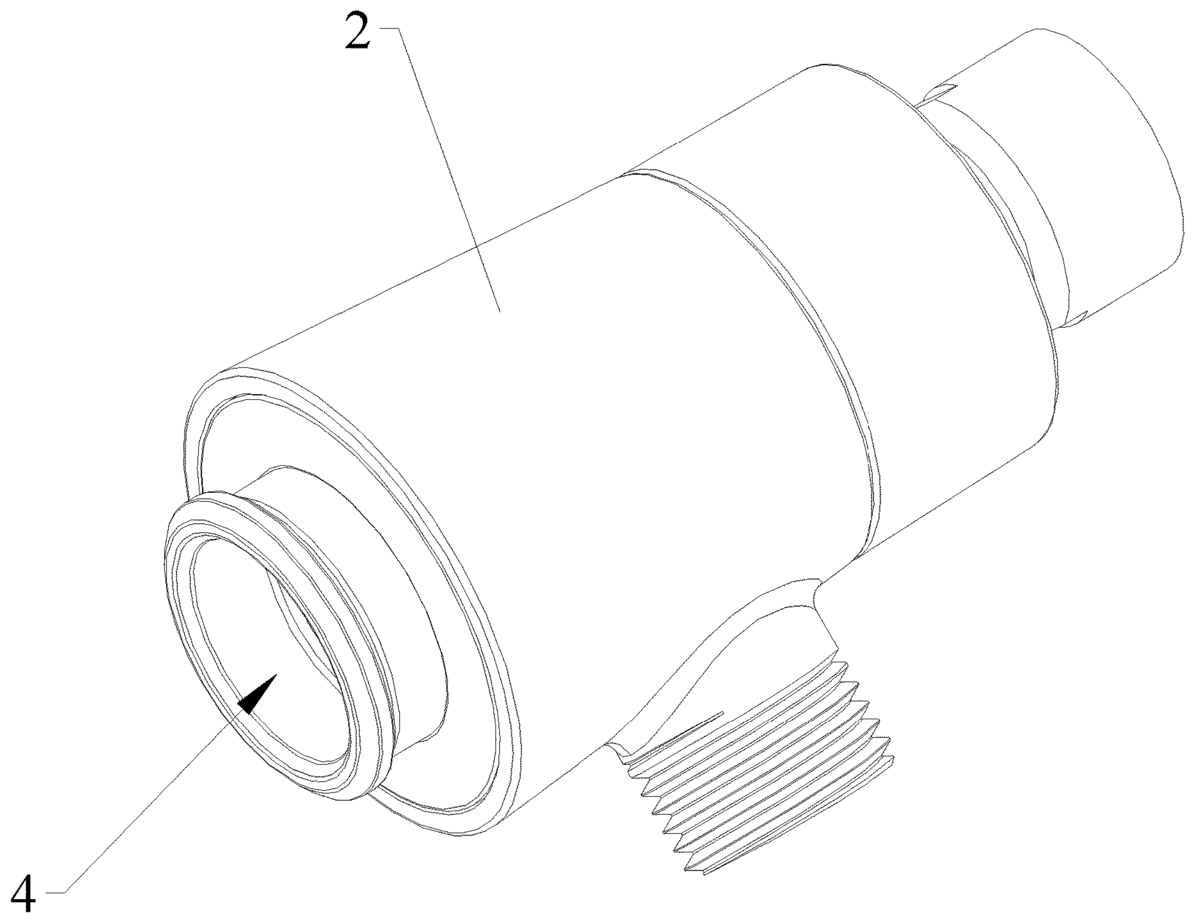
FIG. 6 is a perspective view of the fixing seat and the second magnetic assembly according to an embodiment of the present invention.
Figure 7:
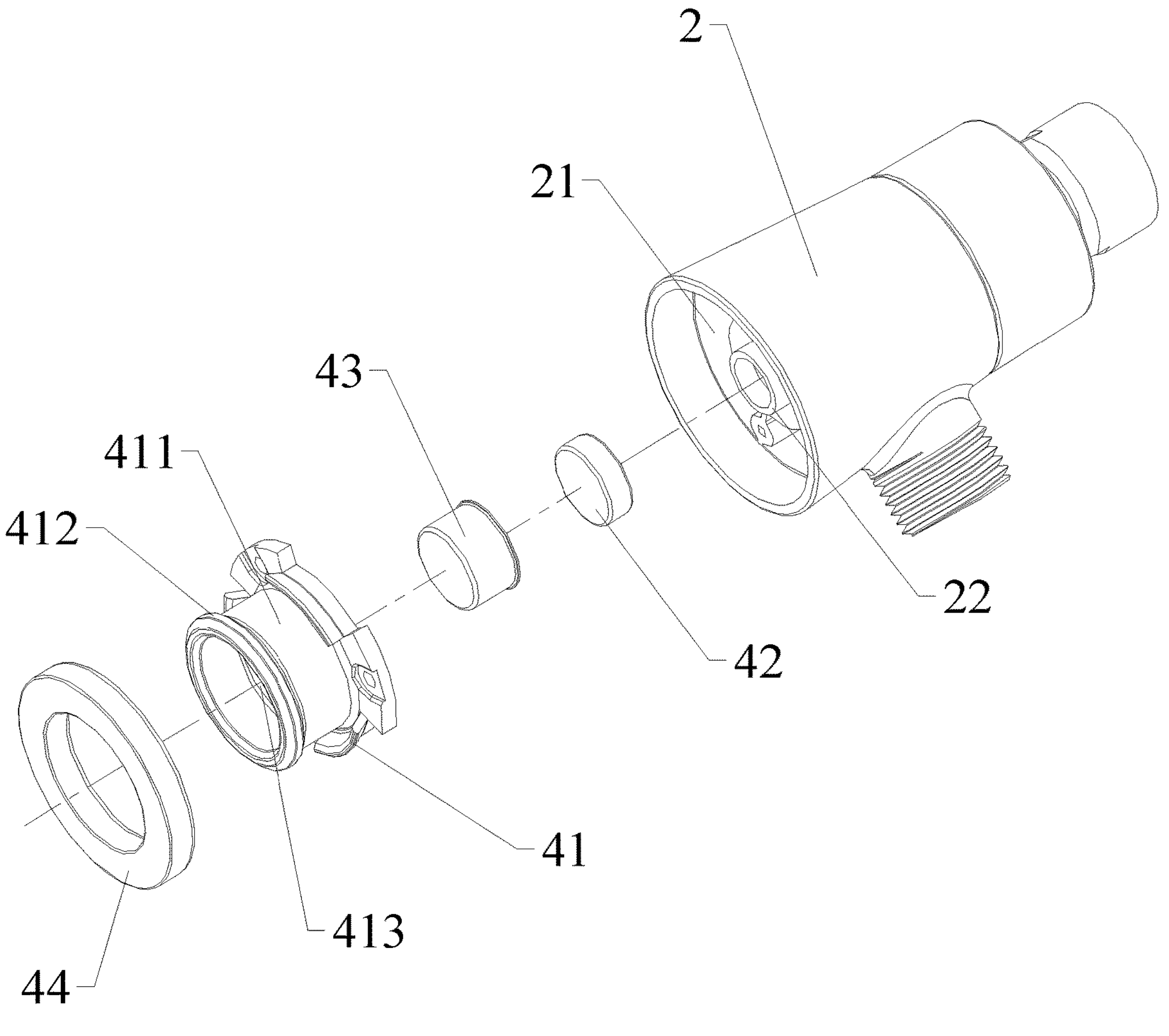
FIG. 7 is an exploded view of FIG. 6.

With reference to FIG. 5, one side of the fastener groove 331 is a first inclined surface 333. The first inclined surface 333 is positioned on a side of the fastener groove 331 which is more proximal to a center of the annular groove 311 along a radial direction of the annular groove 311. When the first magnetic piece 32 and the second magnetic piece 42 are magnetically attached to each other, a portion of the insertion cylinder 411 is also inserted into the fastener groove 331 and abuts against the first inclined surface 333, and due to abutment against the first inclined surface 333, an end of the portion of the insertion cylinder 411 inserted into the fastener groove 331 will drive the fastener 33 to move into the annular groove 311 along a radial direction of the annular groove 311. Therefore, the second mounting seat 41 can drive the fastener 33 to move by means of the first inclined surface 333. In other words, the magnetic force between the first magnetic piece 32 and the second magnetic piece 42 is translated into a radial force of the fastener 33 through the first inclined surface 333 so that the fastener 33 is driven to move into the annular groove along radial direction of the annular groove.

With reference to FIG. 5, an outer side of the position limiting flange 332 facing away from the fastener groove and an inner side of the position limiting flange 332 facing towards the fastener groove are provided with a second inclined surface 334 and a third inclined surface 335 respectively. The second inclined surface 334 and the third inclined surface 335 achieve a similar function like the first inclined surface 333 in that they are also used for translating external force to radial force of the fastener 33. Specifically, when said end of the portion of the insertion cylinder 411 is in contact with the second inclined surface 334 during insertion of the insertion cylinder 411 into the annular groove 311, the fastener 33 is being pushed away from the annular groove 311 along a radial direction of the annular groove 311 so that the position limiting ring 412 can pass the position limiting flange 332 and thus allowing the insertion cylinder 411 to be inserted into the insertion groove 331. When user needs to take out the shower head 1, pull the shower head 1 along an axial direction of the insertion cylinder 411 so that the position limiting ring 412 will first be in contact with the third inclined surface 335; similarly, by continue pulling the shower head 1, the fastener 33 will also be pushed away from the annular groove 311 along a radial direction of the annular groove 311 so that the position limiting ring 412 can pass the position limiting flange 332 to allow the insertion cylinder 411 to be disengaged from the annular groove 331.

The annular groove 311 is positioned on a front side of the first mounting seat 31; a back side of the first mounting seat 31 is provided with a fastener mounting groove 312 extending into the annular groove 311 along a radial direction of the annular groove 311 so that the fastener mounting groove 312 is in communication with the annular groove 311 through an outer side wall of the annular groove 311. The fastener 33 is movably fitted in the fastener mounting groove 312 so as to be moved along a radial direction of the annular groove 311 as driven by the insertion cylinder 411.

Figure 4:
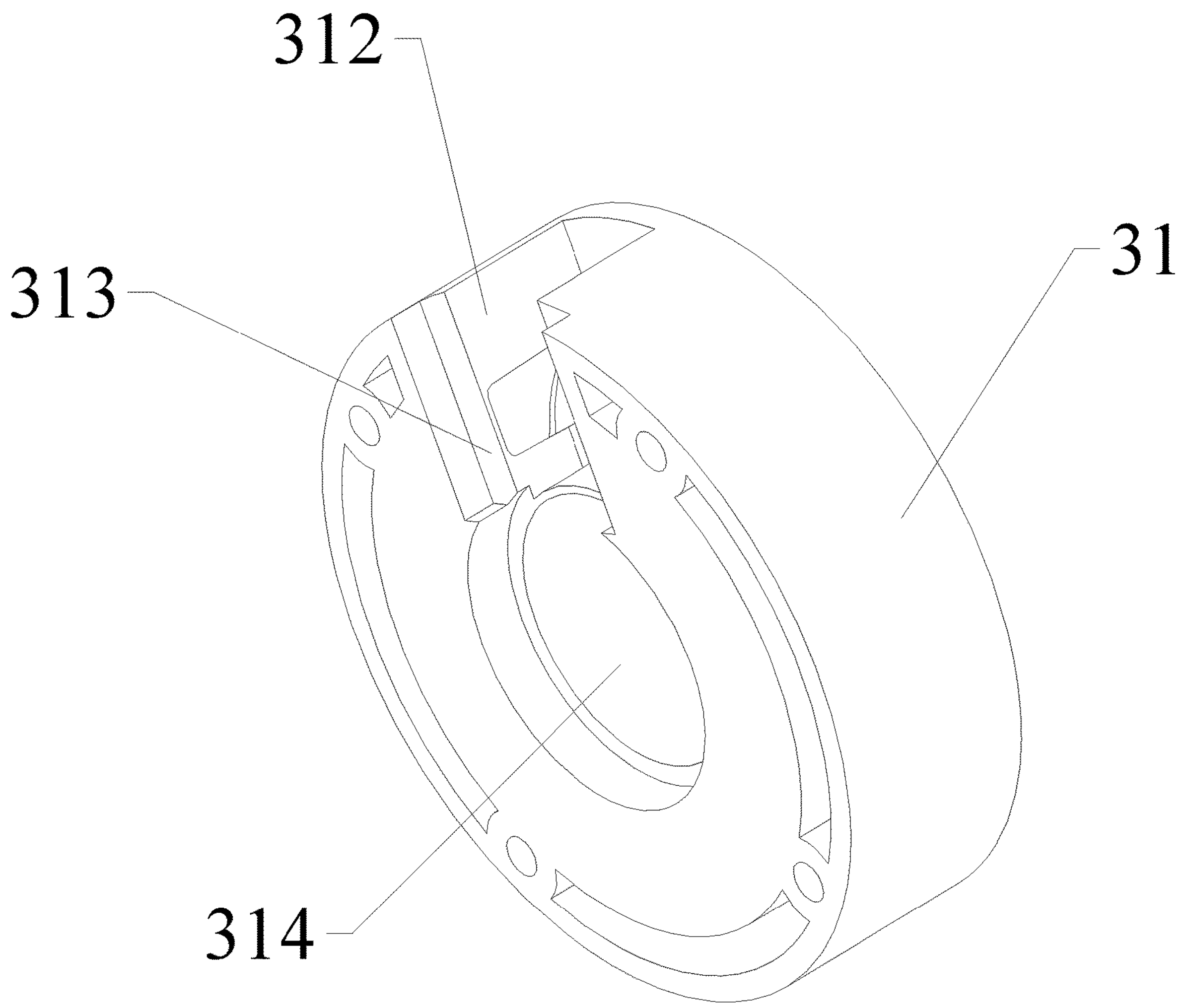
FIG. 4 is a perspective view of the first mounting seat according to an embodiment of the present invention.

Further, with reference to FIG. 4, two sides of the fastener mounting groove 312 are each provided with the a guiding platform 313; two sides of the fastener 33 are each provided with a guiding flange 336 slidably fitted with a corresponding guiding platform 313. Slidable fitting between each guiding platform 313 and a corresponding guiding flange 336 guides a moving direction of the fastener 33, and also limits the fastener 33 from being disengaged from the fastener mounting groove 312 and hence prevents the fastener 33 from falling off the first mounting seat 31.

The first mounting seat 31 is provided with a first mounting hole 314 in which the first magnetic piece 32 is mounted; the second mounting seat 41 is provided with a second mounting hole 413 in which the second magnetic piece 42 is mounted. In this embodiment, the first mounting hole 314 and the second mounting hole 413 are positioned at a center of the annular groove 311 corresponding to the space enclosed by the inner side wall of the annular groove 311 and a center of the insertion cylinder 411 respectively.

Further, a first shell 34 is fitted and axially limited in the first mounting hole 314, and a second shell 43 is fitted and axially limited in the second mounting hole 413. The first shell 34 and the second shell 43 house the first magnetic piece 32 and the second magnetic piece 42 respectively so that the first magnetic piece 32 and the second magnetic piece 42 will not easily fall off. Also, the first shell 34 and the second shell 43 protect surfaces of the first magnetic piece 32 and the second magnetic piece 42 and achieve waterproof and anti-corrosion functions.

Besides, the shower head 1 and the fixing seat 2 are provided with a first column 12 and a second column 22 respectively. In accordance with the mounting positions of the first magnetic assembly 3 and the second magnetic assembly 4, the first column 12 and the second column 22 are inserted into the first shell 34 and the second shell 43 respectively and also abut against the first magnetic piece 32 and the second magnetic piece 42 respectively so as to fix the first magnetic piece 32 and the second magnetic piece 43. In other words, except for the first mounting seat 31 and the second mounting seat 41, all other components do not require additional connective means. After the first mounting seat 31 and the second mounting seat 41 are fixed, all other components are fixed in position relative to one another by their structural relationships. Accordingly, assembly is more convenient.

The second magnetic assembly 4 also comprises a friction ring 44 disposed circumferentially around the insertion cylinder 411. The friction ring 44 can be made of materials like polyoxymethylene so as to contain good physical; mechanical and chemical properties, and particularly good resistance against frictions. Accordingly, the friction ring 44 can have a long service life and prevent friction loss of the first mounting seat 31 and the second mounting seat 41, and can also reduce the squeaking sounds produced by frictions when the first mounting seat 31 and the second mounting seat 41 are in contact with each other. The friction ring 44 can be removably mounted to the second mounting seat 41 by, for example, fastening.

The first magnetic piece 32 is made of stainless steel; the second magnetic piece 42 is a neodymium magnet. In this embodiment, since the first magnetic assembly 3 is mounted on the shower head 1 and the second magnetic assembly 4 is mounted on the fixing seat 2, the stainless steel first magnetic piece 32 is mounted on the shower head 1 and can be magnetically attracted by the magnet on the fixing seat 2 to achieve magnetic connection between the shower head 1 and the fixing seat 2. Since the shower head 1 itself is not magnetic, use of the shower head 1 will not be affected.

The fixing seat 2 can be a socket installed on a wall, or can be a three-way connector according to this embodiment. A water inlet end of the three-way connector is connected to a water supply; a water outlet end of the three-way connector is in communication with the water inlet end, and is connected to at least one water outlet device such as a water hose of the shower head and/or an overhead shower head; the shower head 1 is directly attached magnetically to a third end of the three-way connector. By use of this three-way connector, number of parts during installation can be reduced, and the structure resulted can be more clean and neat.

Figure 8:
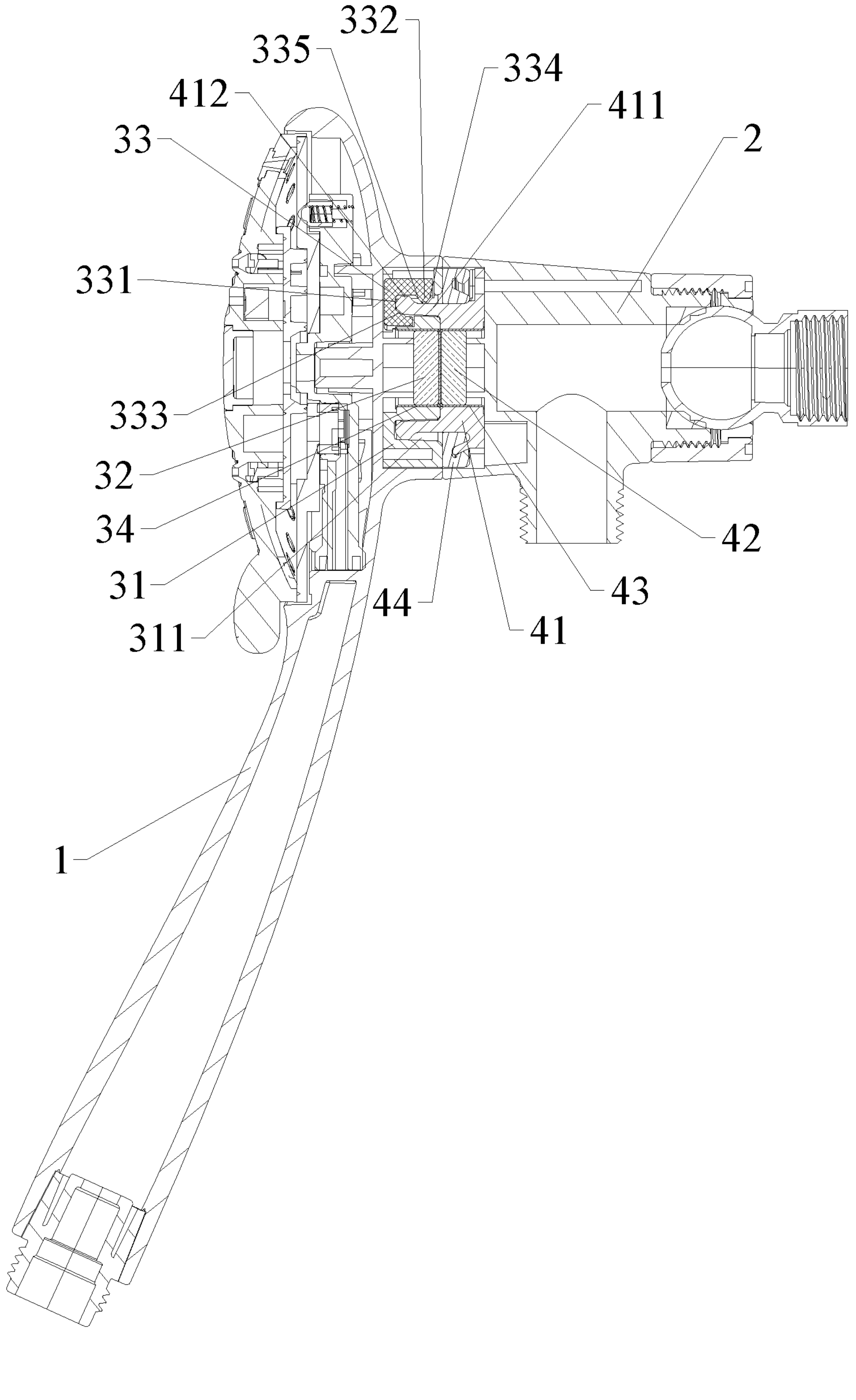
FIG. 8 is a sectional view showing the shower head positioned parallel to the fixing seat according to an embodiment of the present invention.
Figure 9:
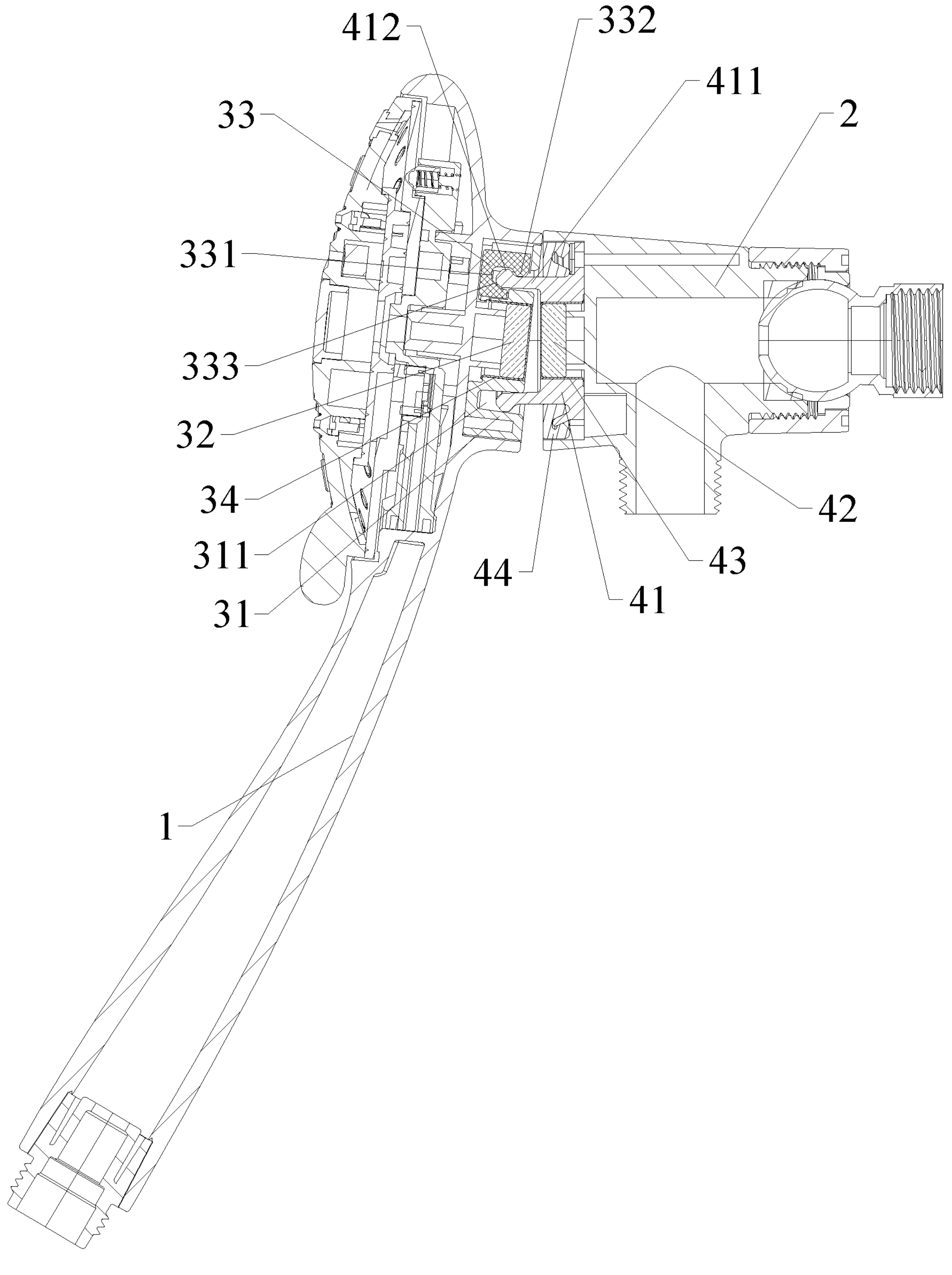
FIG. 9 is a sectional view showing the shower head tilted with respect to the fixing seat according to an embodiment of the present invention.

With reference to FIG. 8 and FIG. 9 the present invention has the following operating principles:

When the shower head 1 is placed near to the fixing seat 2, the first magnetic piece 32 and the second magnetic piece 42 are guided to be magnetically attracted to each other; when the insertion cylinder 411 is inserted into the annular groove 311, an end of a portion of the insertion cylinder 411 inserted into the annular groove 311 will abut against the second inclined surface 334 so that the fastener 33 will be driven to move away from the annular groove 311 along a radial direction of the annular groove 311 and thereby allowing the insertion cylinder 411 to continue its insertion. When the shower head 1 is continued to be placed nearer to the fixing seat 2, the end of the portion of the insertion cylinder 411 abut against the first inclined surface 333 so that the fastener 33 is driven to move reversely into the annular groove 311 along the radial direction of the annular groove 311, so that the position limiting flange 332 locks the position limiting ring 412, Accordingly, the shower head 1 is locked in position along an axial direction of the annular groove 311/the insertion cylinder 411. Therefore, the present invention can lock the shower head 1 in case when user accidentally displaces the shower head 1 due to various external forces, thereby protecting the shower head 1 from falling off. Specifically, when the shower head 1 is accidentally displaced in a tilted condition with respect to the fixing seat 2 as shown in FIG. 9, the position limiting ring 412 can act vertically onto the third inclined surface 335 so that the fastener 33 cannot move and so the locking state of the shower head 1 is still being maintained. Only when the shower head 1 is positioned parallel to the fixing seat 2 as shown in FIG. 8 can the shower head 1 be pulled to disengage from the fixing seat 2.

According to the above technical solutions, the present invention provides a fastener 33 in the first magnetic assembly 3, wherein the fastener 33 is movable along a radial direction; specifically, after the insertion cylinder 411 is inserted into the annular groove 311, an end of a portion of the insertion cylinder 411 abutting against the fastener 33 will drive the fastener 33 to move into the annular groove 311 along a radial direction of the annular groove 311, so that the position limiting flange 332 of the fastener 33 limits the position limiting ring 412 of the insertion cylinder 411 from moving along an axial direction of the annular groove 311/insertion cylinder 411, thereby preventing the shower head 1 from falling off. The annular groove 311 and the insertion cylinder 411 are both in a circular shape so that the shower head 1 can be fixed with the fixing seat 2 no matter how the showerhead 1 is rotated on a plane parallel to the fixing seat 2 before it is fixed with the fixing seat 2. Use of the present invention is facilitated since the shower head 1 can be fixed with the fixing seat 2 at more than one position at any angle rotated with respect to the fixing seat 2 on the plane parallel to the fixing seat 2. The first magnetic piece 32 and the second magnetic piece 42 achieve the basic magnetic connection, and provide a magnetic driving force which is translated to a radial force of the fastener 33 during insertion of the insertion cylinder 411 into the annular groove 311. The greater the magnetic force, the more stable will be the position limiting effect between the position limiting flange 332 and the position limiting ring 412.

The embodiment described above and the accompanying drawings are not intended to limit the types and forms of the present invention. Any non-inventive changes or modifications of the embodiment described above by a skilled person in the art should fall within the scope of present invention.

What is claimed is:

1. A magnetic shower head that can be prevented from falling off, comprising a shower head and a fixing seat which the shower head is magnetically attached to, and also comprising a first magnetic assembly and a second magnetic assembly to achieve magnetic attachment between the shower head and the fixing seat; one of the first magnetic assembly and the second magnetic assembly is mounted on a back side of the shower head, and another one of the first magnetic assembly and the second magnetic assembly is mounted on the fixing seat; wherein:

the first magnetic assembly comprises a first mounting seat, a first magnetic piece, and a fastener; the first mounting seat is provided with an annular groove; the first magnetic piece is mounted in a space enclosed by an inner side wall of the annular groove; the fastener is installed in the first mounting seat and is movable along a radial direction of the annular groove so as to be movable in and out of the annular groove; the fastener is also provided with a fastener groove which is in communication with the annular groove; one side of an opening of the fastener groove is provided with a position limiting flange;

the second magnetic assembly comprises a second mounting seat and a second magnetic piece; an insertion cylinder is projected from the second mounting seat; a periphery of a free end of the insertion cylinder is provided with a position limiting ring; the second magnetic piece is mounted inside the insertion cylinder;

the annular groove is positioned on a front side of the first mounting seat; a back side of the first mounting seat is provided with a fastener mounting groove extending into the annular groove along a radial direction of the annular groove so that the fastener mounting groove is in communication with the annular groove through an outer side wall of the annular groove; the fastener is movably fitted in the fastener mounting groove.

2. The magnetic shower head of claim 1, wherein the insertion cylinder is removably inserted into the annular groove, so that when the second magnetic piece and the first magnetic piece are magnetically attached to each other, the fastener is driven to move into the annular groove along a radial direction of the annular groove so that the position limiting ring is prevented from moving along an axial direction of the annular groove by the position limiting flange of the fastener.

3. The magnetic shower head of claim 2, wherein one side of the fastener groove is a first inclined surface; the first inclined surface is positioned on a side of the fastener groove which is proximal to a center of the annular groove along a radial direction of the annular groove; when the first magnetic piece and the second magnetic piece are magnetically attached to each other, a portion of the insertion cylinder is also inserted into the fastener groove and abuts against the first inclined surface.

4. The magnetic shower head of claim 2, wherein an outer side of the position limiting flange facing away from the fastener groove and an inner side of the position limiting flange facing towards the fastener groove are provided with a second inclined surface and a third inclined surface respectively.

5. The magnetic shower head of claim 1, wherein two sides of the fastener mounting groove are each provided with a guiding platform; two sides of the fastener are each provided with a guiding flange slidably fitted with a corresponding guiding platform.

6. The magnetic shower head of claim 1, wherein the first mounting seat is provided with a first mounting hole in which the first magnetic piece is mounted; the second mounting seat is provided with a second mounting hole in which the second magnetic piece is mounted.

7. The magnetic shower head of claim 6, wherein a first shell is fitted and axially limited in the first mounting hole, and a second shell is fitted and axially limited in the second mounting hole; the first shell and the second shell house the first magnetic piece and the second magnetic piece respectively.

8. The magnetic shower head of claim 1, wherein the second magnetic assembly also comprises a friction ring disposed circumferentially around the insertion cylinder.

9. The magnetic shower head of claim 1, wherein the first magnetic piece is made of stainless steel; the second magnetic piece is a neodymium magnet.

* * * * *